(12) United States Patent
Janssen

(10) Patent No.: US 9,172,847 B2
(45) Date of Patent: *Oct. 27, 2015

(54) SCANNING METHOD AND DEVICE FOR OBTAINING COLOR IMAGES

(75) Inventor: Johannes H. M. Janssen, Velden (NL)

(73) Assignee: Oce-Technologies B.V., Venlo (NL)

( * ) Notice: Subject to any disclaimer, the term of this patent is extended or adjusted under 35 U.S.C. 154(b) by 168 days.

This patent is subject to a terminal disclaimer.

(21) Appl. No.: 13/267,583

(22) Filed: Oct. 6, 2011

(65) Prior Publication Data

US 2012/0033274 A1     Feb. 9, 2012

Related U.S. Application Data

(63) Continuation of application No. PCT/EP2010/054565, filed on Apr. 7, 2010.

(30) Foreign Application Priority Data

Apr. 9, 2009    (EP) .................................. 09157730

(51) Int. Cl.
    *H04N 1/04*    (2006.01)
    *H04N 1/48*    (2006.01)
    *H04N 1/60*    (2006.01)

(52) U.S. Cl.
    CPC ................ *H04N 1/48* (2013.01); *H04N 1/486* (2013.01); *H04N 1/60* (2013.01)

(58) Field of Classification Search
    CPC ........................................................ H04N 1/48
    USPC ........................................................ 358/505
    See application file for complete search history.

(56) References Cited

U.S. PATENT DOCUMENTS

| 5,262,631 | A |   | 11/1993 | Yamamoto et al. |
|---|---|---|---|---|
| 5,923,447 | A |   | 7/1999 | Yamada |
| 6,104,510 | A | * | 8/2000 | Hu et al. ........................ 358/509 |
| 6,346,999 | B1 |   | 2/2002 | Udagawa et al. |
| 6,396,596 | B1 | * | 5/2002 | Hosier et al. .................... 358/1.9 |
| 2002/0140706 | A1 | * | 10/2002 | Peterson et al. .............. 345/611 |
| 2006/0098248 | A1 |   | 5/2006 | Suzuki et al. |

FOREIGN PATENT DOCUMENTS

| DE | 10008045 A1 | 8/2000 |
|---|---|---|
| WO | WO 2007/062679 A1 | 6/2007 |

* cited by examiner

*Primary Examiner* — Benny Q Tieu
*Assistant Examiner* — Michael Y Tzeng
(74) *Attorney, Agent, or Firm* — Birch, Stewart, Kolasch & Birch, LLP

(57) ABSTRACT

In a method of scanning an image on an original, an optical sensor including sensor elements for each of a number of basic colors is used to generate pixel values of rows of pixels of the scanned image. The sensor elements are used to generate grey scale pixel values representing different parts of the image. A first sensor element for each of the basic colors is used to generate pixel values of odd pixels of rows on the original, and a second sensor element for each of the basic colors is used to generate pixel values of even pixels of rows of the original. Each color pixel value is generated mainly on the basis of a pixel value of at least one of the first sensor elements and pixel values of at least two of the second sensor elements for adjacent pixels.

13 Claims, 5 Drawing Sheets

| sp# | r# | O, E | | |
|---|---|---|---|---|
| 1 | 1, 2 | R -13 (O) | G -7 (O) | B -3 (E) |
| 2 | 2, 3 | R -14 (E) | G -7 (O) | B -1 (O) |
| 3 | 3, 4 | R -12 (O) | G -8 (E) | B -1 (O) |

Fig. 7

SCANNING METHOD AND DEVICE FOR OBTAINING COLOR IMAGES

CROSS-REFERENCE TO RELATED APPLICATIONS

This application is a Continuation of International Application No. PCT/EP2010/054565, filed on Apr. 7, 2010, and for which priority is claimed under 35 U.S.C. §120, and which claims priority under 35 U.S.C. §119 to Application No. 09157730.4, filed on Apr. 9, 2009. The entirety of each of the above-identified applications is expressly incorporated herein by reference.

BACKGROUND OF THE INVENTION

1. Field of the Invention

The present invention relates to the field of scanning. More specifically, the present invention relates to a method of scanning an image on an original, and a scanning device arranged to perform the method of scanning.

In a scanning device of the present invention, an optical sensor is provided comprising sensor elements for each of a number of basic colors to generate pixel values of a scanned image. Each pixel value represents an optical density of a pixel of the image. In this way, a color image of the original is obtained using a color scanner. The image on the original may be a grey scale or B/W (black and white) image, or may be a color image.

2. Background of the Invention

A scanner usually has a light source emitting white light. In reduction type scanners, an optical sensor with one or more linear CCD (Charge Coupled Device) arrays and a lens are arranged to focus lines of an original onto the CCD line arrays. In contact type scanners, lines of the original are captured onto the CCD line arrays through a lens array.

In a color scanner, there are, for example, at least three CCD line arrays having color filters for red (R), green (G), and blue (B) light, respectively, thus forming sensor elements for the basic colors of red, green, and blue light. Typically, the sensor elements for different colors have different light sensitivities. When a color image is to be obtained from an original, the original is scanned, and the signals from the sensor elements for red, green, and blue light are mathematically mixed or processed in order to calculate the intensities from the RGB values of each pixel of the image. Hence, the color level of a pixel is a function (e.g. by applying an algebraic scheme or by applying look-up tables) of the RGB values, wherein the function is predefined or otherwise determined to obtain a desired image.

Usually, each pixel of the original image is scanned by each of the sensor elements for different colors. Due to a mechanical spacing between the sensor elements or CCD line arrays, each pixel is scanned by time-multiplexing signals originating from different sensor elements. An output image is composed from said signals by giving each signal an appropriate delay.

The scan speed of a reduction type or a contact type scanner is limited by the maximum clock speed of the CCD. This is a serious limitation in view of a demand for high scan resolutions to be obtained in a shortest possible time.

SUMMARY OF THE INVENTION

It would be desirable to provide a scanning device and a method of scanning in which an image can be obtained from a grey scale or B/W and/or from a color original at high speed.

To better address this concern, in a first aspect of the present invention a method of scanning an image on an original is provided, wherein an optical sensor comprising sensor elements for each of a number of basic colors is used to generate pixel values of rows of pixels of the scanned image, wherein each pixel value represents an optical density of a pixel of the image. Each of the sensor elements for each of the basic colors is used to generate pixel values representing substantially different parts of the image. A first sensor element for each of the number of basic colors is used to generate pixel values of pixels of rows on the original in a first column, and a second sensor element for each of the number of basic colors is used to generate pixel values of pixels of rows on the original in a second column adjacent to the first column. For a pixel, a color pixel value is generated mainly on the basis of a pixel value of at least one of the first sensor elements and a pixel value of at least two of the second sensor elements for adjacent pixels.

It is noted here, that if the original is a grey scale or B/W original, the image to be obtained from the original will again be a substantially grey scale or B/W image.

For example, the first and second sensor elements are arranged in parallel at slightly different positions along a transport direction, each first or second sensor element scanning a row of pixels on the original simultaneously, where all sensor elements may operate simultaneously. Here, the transport direction is a direction of relative movement of the original and the sensor elements.

In an embodiment of the present invention, pixel values of odd pixels being in one column of pixels on the original, and pixel values of even pixels being in an adjacent column of pixels on the original are used to generate color pixel values of pixels in either the column of odd pixels or the column of even pixels. In other words, for a scanning of a first pixel using three basic colors, a pixel value of the first pixel is combined with a pixel value of a second pixel and a third pixel situated immediately to the left or the right of the first pixel in a same row of pixels, and/or situated immediately above or below the first pixel in a same column of pixels. Each of the first, second, and third pixels is scanned by a sensor element for a different basic color, thereby assuring that a color value for the first pixel is generated in an optimum way at high speed with acceptable resolution.

In a second aspect, according to the present invention, a scanning device is provided, the scanning device having an optical sensor comprising sensor elements for each of a number of basic colors, the scanning device being adapted to generate pixel values of a scanned image, wherein each pixel value represents an optical density of a pixel of the image. The scanning device is adapted to operate according to the method of the present invention.

In an embodiment, the scanning device may comprise a shutter to control a light integration time of each sensor element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 illustrates a method of scanning in an embodiment of the present invention;

FIG. 5 illustrates a result of the method of scanning of FIG. 4;

FIG. 6 illustrates a further method of scanning, employing a shutter, in an embodiment of the present invention;

FIG. 7 illustrates a result of the method of scanning of FIG. 6;

DETAILED DESCRIPTION OF THE PREFERRED EMBODIMENTS

Figure 1:
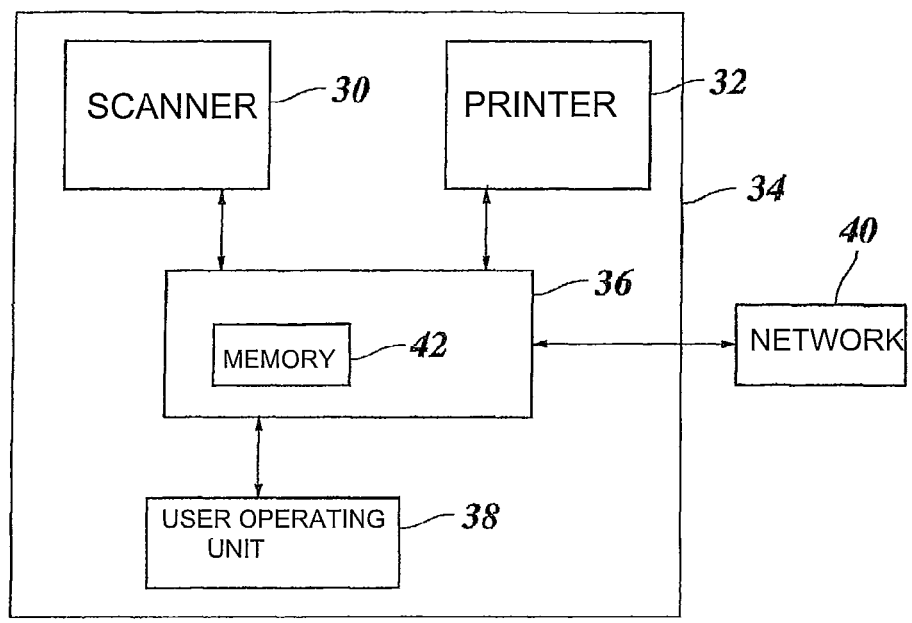
FIG. 1 schematically shows components of a copier including a scanner and a printer.

The present invention will now be described with reference to the accompanying drawings, wherein the same reference numerals have been used to identify the same or similar elements throughout the several views.

FIG. 1 depicts a scanning device or scanner 30 in an embodiment of the present invention. The scanner 30, together with a printer 32, forms a copier 34. A control unit 36 controls the scanner 30 and the printer 32 and is connected to a user operating unit 38 and an internal or external network, such as network 40. When the scanner 30 reads an original, the scanned image may be transferred to a memory 42 of the control unit 36 and printed by the printer 32, or it may be transferred via the network 40 for further processing to, for example, a PC.

Figure 2:
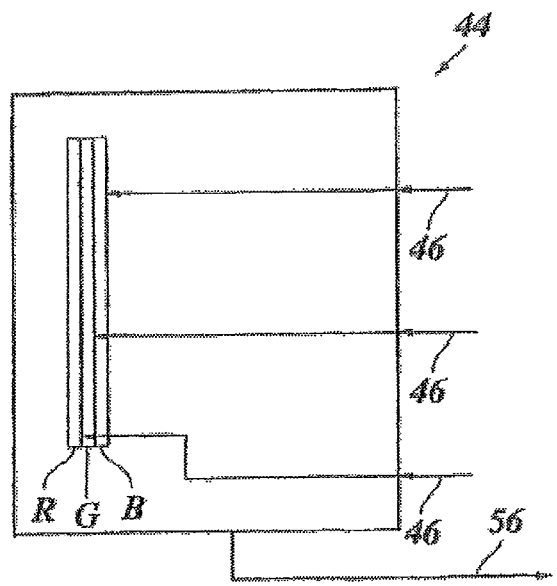
FIG. 2 schematically shows an optical sensor of the scanner.

FIG. 2 shows an embodiment of an optical sensor 44, like a CCD device, of the scanner 30. The sensor 44 has three parallel CCD line arrays of sensor element assemblies R, G, and B, each sensor element assembly having two sensor elements. Clock signals 46 for the CCDs are generated to synchronously scan the sensor elements. The pixel values detected by the optical sensor 44 are output on a signal line 56, and stored in a buffer memory. The buffer memory may input the pixel values to a processor, which processes the input pixel values to generate color pixel values for printing a color image of the original or otherwise providing a color image. The processor may comprise software containing instructions to perform the processing described in more detail below.

Different configurations for generating clock signals 46 may be applied in a scanner that uses CCD technology.

Figure 3:
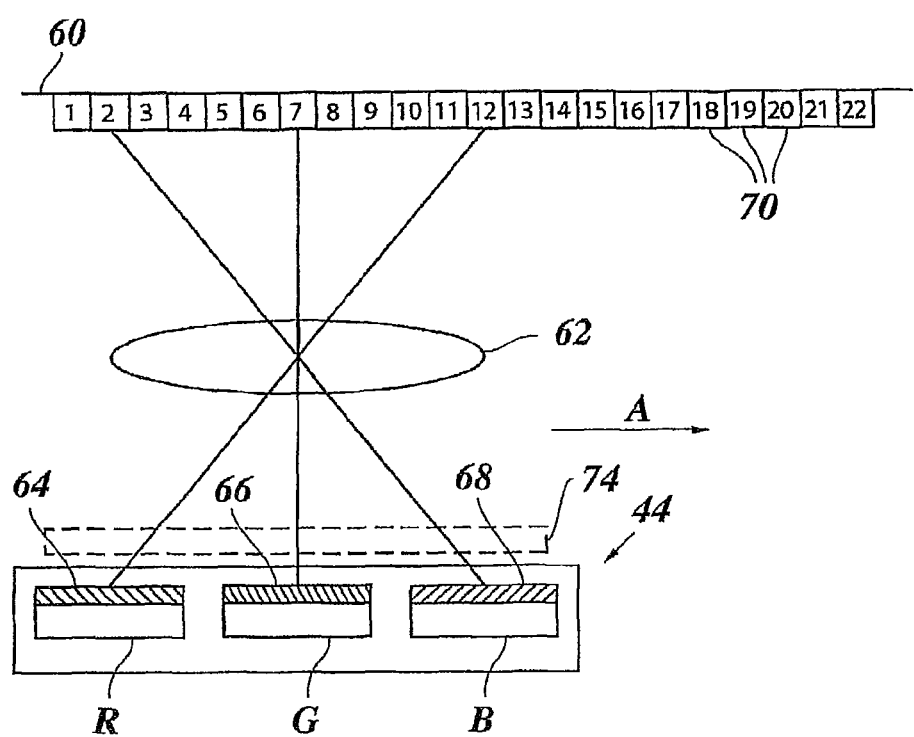
FIG. 3 schematically shows three sensor elements of an optical sensor.

As shown in FIG. 3, the optical sensor may be of the reduction type. Rows (also referred to as lines) of an original 60, which extend perpendicular to the plane of the drawing of FIG. 1, are projected by a lens device 62 onto the arrays of sensor element assemblies R, G, B, which also extend perpendicular to the plane of the drawing of FIG. 1. White light from a light source illuminates the original in a manner known in the art. The sensor element assembly R has a color filter 64 for red light. The sensor element assemblies G and B are equipped with color filters 66 and 68 for green and blue light, respectively. The arrays of sensor element assemblies R, G, B are arranged in parallel, and different sensor element assemblies are focused on different rows of the original 60. FIG. 3 illustrates a column (parallel to the plane of the drawing) of pixels 70 of the original belonging to image rows 1 to 22 (perpendicular to the plane of the drawing).

A scanning procedure will now be explained in conjunction with FIG. 4. During the scanning process, the optical sensor 44 is moved relative to the original 60 in a scan direction A (see also FIG. 3). The sensor element assembly R comprises two sensor elements: a sensor element RO for scanning red light from odd pixels of rows of the scanned image, and a sensor element RE for scanning red light from even pixels of rows of the scanned image. Likewise, the sensor element assembly G comprises two sensor elements: a sensor element GO for scanning green light from odd pixels of rows of the scanned image, and a sensor element GE for scanning green light from even pixels of rows of the scanned image. The sensor element assembly B comprises two sensor elements: a sensor element BO for scanning blue light from odd pixels of rows of the scanned image, and a sensor element BE for scanning blue light from even pixels of rows of the scanned image. Odd pixels having the same number (e.g. 1, 3, 5, . . . ) in different rows of the scanned image together form a column of odd pixels. Likewise, even pixels having the same number (e.g. 2, 4, 6, . . . ) in different rows of the scanned image together form a column of even pixels.

Figures 4, 5:
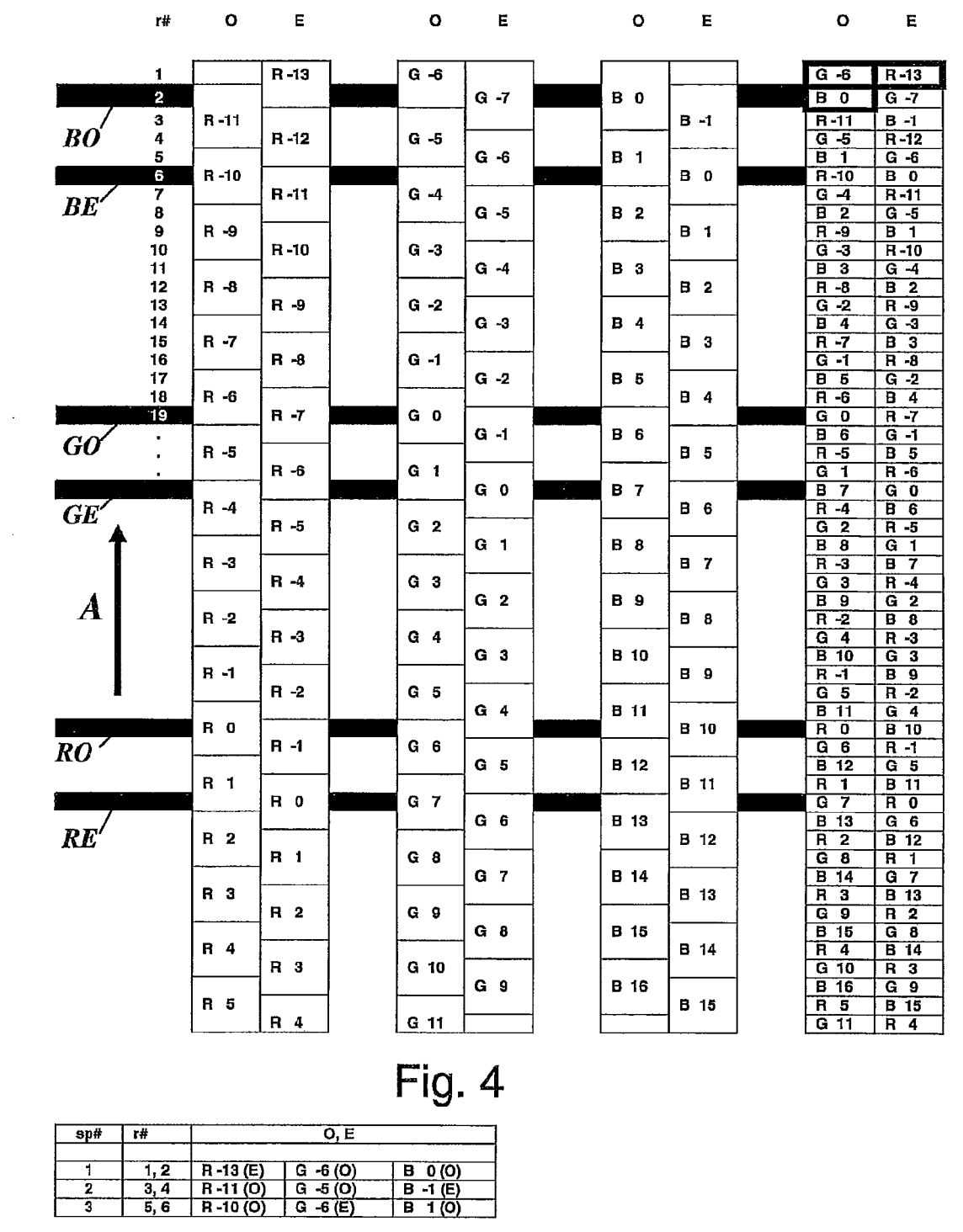

In FIG. 4, at the left-hand side, two adjacent columns of odd (O) and adjacent even (E) pixels of rows of the scanned image are shown for different clock periods (also referred to as cycle times) of the sensor elements RO, and RE, respectively. In FIG. 4, an indication 'Y x' (where Y=R, G, or B, and x=integer) means the x-th clock period for basic color Y for sensor elements YO, and YE, respectively. Next, two adjacent columns of odd (O) and even (E) pixels of the same rows of the scanned image are shown for the different clock periods of the sensor elements GO, and GE, respectively. For ease of explanation, the pair of pixel columns scanned by sensor elements GO, GE has been drawn next to the pair of pixel columns scanned by sensor elements RO, RE, while in fact these pairs of columns overlie one another since they relate to the same pixel columns. Next, two adjacent columns of odd (O) and even (E) pixels of the same rows of the scanned image are shown for the different clock periods of the sensor elements BO, and BE. Again, for ease of explanation, the pair of pixel columns scanned by sensor elements BO, BE has been drawn next to the pair of pixel columns scanned by sensor elements GO, GE, while in fact these pairs of pixel columns overlie one another. So, all three pixel columns marked O overlie one another, and all three pixel columns marked E overlie one another.

The operation cycles of the CCDs of the sensor elements RO, RE, GO, GE, BO, and BE are synchronized. In a clock period, each sensor element passes over three rows of pixels (hereinafter also referred to as original pixels) on the original. The light integration time of the sensor elements within each operation cycle is chosen such that the signals provided by each sensor element are mainly representative for the original pixels in the second row of the three rows of original pixels.

As illustrated in the pair of columns of odd (O) and even (E) pixels shown at the right-hand side of FIG. 4, as an example, a (color) pixel value of a pixel (hereinafter also referred to as a scan pixel) in an odd or even column is generated on the basis of a combination of a signal (pixel value) from sensor element RO or RE, combined with a signal (pixel value) from sensor element GO or GB, and combined with a signal (pixel value) from sensor element BO or BE. Thus, a scan pixel may be formed from signals (pixel values) from a combination of sensor elements RO, GO, and BE, a combination of sensor elements RO, GE, and BO, a combination of sensor elements RE, GO, and BO, a combination of sensor elements RO, GE, and BE, a combination of sensor elements RE, GO, and BE, or a combination of sensor elements RE, GE, and BO.

As an example, in the right-hand pair of columns of FIG. 4, it is illustrated to form a color scan pixel from original pixels in the odd and even columns in rows r#1 and 2 of pixels, by combining signals obtained by sensor element GO in clock period −6, sensor element RE in clock period −13, and sensor element BO in clock period 0, as indicated by bold lines. Thus, two signals from sensor elements for the odd pixel column are combined with a signal from a sensor element for an adjacent even pixel column, to form a color scan pixel of the odd and even columns extending over two adjacent original pixel rows. As another example, a color scan pixel may be formed from original pixels in the odd and even columns in rows r#3 and 4 of pixels, by combining signals obtained by sensor element RO in clock period −11, sensor element BE in clock period −1, and sensor element GO in clock period −5. Other color scan pixels may be obtained in a similar way.

Further, in a similar way, color scan pixels for pairs of rows of original pixels in the odd and even pixel columns can also be obtained in the following way. As an example, referring again to the right-hand pair of columns of FIG. 4, a color scan pixel from rows r#9 and 10 of pixels can be formed by combining signals obtained by sensor element BE in clock period 1, sensor element RE in clock period −10, and sensor element GO for an odd pixel column not shown in FIG. 4 adjacent to the even pixel column and on the right-hand side thereof, in a predetermined clock period. Alternatively, a color scan pixel from rows r#9 and 10 of pixels can be formed by combining signals obtained by sensor element BE in clock period 1, sensor element RE in clock period −10, and sensor element GO in clock period −3 for the odd pixel column shown in FIG. 4 adjacent to the even pixel column and on the left-hand side thereof.

FIG. 5 illustrates the combination of signals from sensor elements for forming scan pixels sp#1, 2, and 3 from pairs of adjacent rows r#1, 2, and 3, 4, and 5, 6, respectively. In FIG. 5, the origin of the sensor element signal (odd (O) or even (E) column) is indicated between brackets.

In accordance with the above, a pixel value based on three adjacent rows of original pixels (in three adjacent rows of original pixels in a column) on the original image is read by only one of the sensor elements RO, RE, GO, GE, BO, BE, and additional color information is obtained from signals pertaining to adjacent original pixels. In fact, one color scan pixel is formed for each 1.5 rows of original pixels, whereas in the time needed for this operation (two clock periods), three rows of original pixels are scanned. Therefore, the scan speed may be up to two times the conventional scan speed of a scanning method in which each pixel on the original image is read by three sensor elements. Alternatively, a weighed function of three adjacent rows of original pixels in a column may be read by one of the sensor elements, where the signal obtained by the sensor element may be taken as representative for the first one, the second one, or the third one of three adjacent rows of original pixels in a column.

Assuming that the original pixel resolution (relating to the original) is PRO, then the scan pixel resolution PRS=½·PRO. As an example, if the original pixel resolution PRO=575 spi, then the scan pixel resolution PRS=287.5 spi. The centers of the original pixels are at a distance of SQRT(2)·½·(1/575)=1/813 inch off the center of the corresponding scan pixel, which is negligible in practice. In many practical applications, a scanner output resolution of 300×300 spi is sufficient for good quality copies.

It is to be observed, however, that in the exemplary embodiment of FIGS. 4 and 5, although the output resolution (scan pixels) is 287.5 spi, the combination of three rows of original pixels in one column are 3/575=1/192 inch long, as seen in the transport direction A. This implies that the combination of the three rows of original pixels in one column is longer than the output resolution. This phenomenon is known as "velocity smear". The velocity smear has a low-pass effect, making the practical vertical resolution lower than the defined output resolution. A positive effect of the velocity smear is the reduction of aliasing due to the scanning/sampling of the original image.

As FIGS. 6 and 7, and 8 and 9 illustrate, a shutter may be used to improve the practical scan resolution, or to further increase the scan speed at about the same quality of the scan. A combination of the scanning schemes of FIGS. 6 and 7, and FIGS. 8 and 9 can also be made having both the effect of improving the scan resolution and increasing the scan speed, when compared to the scanning scheme of FIGS. 4 and 5.

Figures 6, 7:
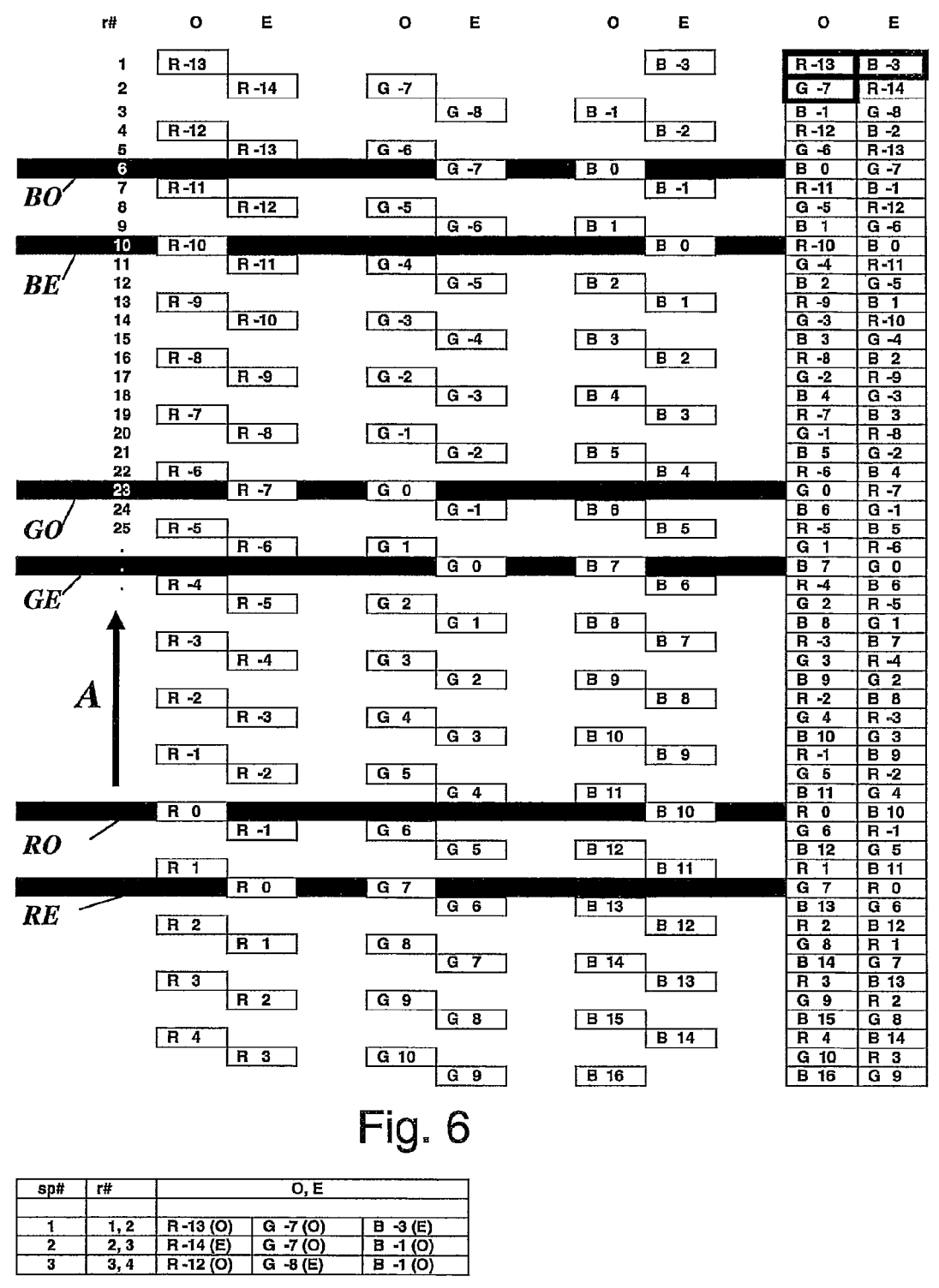

First, as an alternative to generating a pixel value of odd and even pixels of rows on the original image as illustrated with reference to FIGS. 4 and 5, now FIGS. 6 and 7 illustrate that a light integration time of any sensor element RO, RE, GO, GB, BO, BE within each operation cycle stretching over a number of rows of original pixels may be reduced. The way in which this is effected, is by providing a shutter 74 indicated in dashed lines in FIG. 3. Here, a shutter may be defined as a mechanism for limiting a light integration time of a sensor element within each cycle to a part of the cycle time, such as one third (or any other part) of the cycle time. Referring to FIG. 6, the shutter 74 e.g. shuts off the light path from the rows r#5 and 7 to the sensor element BO or GE while the sensor element BO or GE passes over rows 5, 6, and 7, so that the sensor element BO or GE receives the light only from row 6 while passing over rows 5-7. The other sensor elements RO, RE, GO, and BE receive light accordingly, where only the second one of three consecutive rows of original pixels in one pixel column is scanned.

As illustrated in the pair of columns of odd (O) and even (E) pixels shown at the right-hand side of FIG. 6, as an example, a (color) pixel value of a scan pixel in an odd or even column is generated on the basis of a combination of a signal (pixel value) from sensor element RO or RE, combined with a signal (pixel value) from sensor element GO or GB, and combined with a signal (pixel value) from sensor element BO or BE. Thus, a scan pixel may be formed from signals (pixel values) from a combination of sensor elements RO, GO, and BE, a combination of sensor elements RO, GE, and BO, a combination of sensor elements RE, GO, and BO, a combination of sensor elements RO, GE, and BE, a combination of sensor elements RE, GO, and BE, or a combination of sensor elements RE, GE, and BO.

As an example, in the right-hand pair of columns of FIG. 6, it is illustrated to form a color scan pixel from original pixels in the odd and even columns in rows r#1 and 2 of pixels, by combining signals obtained by sensor element GO in clock period −7, sensor element RO in clock period −13, and sensor element BE in clock period −3, as indicated by bold lines. Thus, two signals from sensor elements for the odd pixel column are combined with one signal from a sensor element for an adjacent even pixel column, to form a color scan pixel of the odd and even columns extending over two adjacent original pixel rows. As another example, a color scan pixel may be formed from original pixels in the odd and even columns in rows r#2 and 3 of pixels, by combining signals obtained by sensor element RE in clock period −14, sensor element BO in clock period −1, and sensor element GO in clock period −7. Other color scan pixels may be obtained in a similar way. Here, a difference exists with the method illustrated by FIG. 4, in that in accordance with FIG. 6 each overlapping pair of rows (i.e. e.g. rows r#1 and 2, 2 and 3, 3 and 4, etc.) provides a scan pixel value, whereas in accordance with FIG. 4 each consecutive pair of rows (i.e. e.g. rows r#1 and 2, 3 and 4, 5 and 6, etc.) provides a scan pixel value. However, the scheme with overlapping pairs of rows can of course also be applied in the example of FIG. 4.

Further, in a similar way, color scan pixels for pairs of rows of original pixels in the odd and even pixel columns can also be obtained in the following way. As an example, referring again to the right-hand pair of columns of FIG. 6, a color scan pixel from rows r#9 and 10 of pixels can be formed by combining signals obtained by sensor element BE in clock period 0, sensor element GE in clock period −6, and sensor element RO for an odd pixel column not shown in FIG. 6 adjacent to the even pixel column and on the right-hand side thereof; in a predetermined clock period. Alternatively, a color scan pixel from rows r#9 and 10 of pixels can be formed by combining signals obtained by sensor element BE in clock period 0, sensor element GE in clock period −6, and sensor element RO in clock period −10 for the odd pixel column shown in FIG. 6 adjacent to the even pixel column and on the left-hand side thereof.

FIG. 7 illustrates the combination of signals from sensor elements for forming scan pixels sp#1, 2, and 3 from pairs of adjacent rows r#1, 2, and 2, 3, and 3, 4, respectively. In FIG. 7, the origin of the sensor element signal (odd (O) or even (E) column) is indicated between brackets.

In accordance with the above, effectively each third original pixel (the second one of three adjacent rows of original pixels in a column) on the original image is read by only one of the sensor elements RO, RE, GO, GE, BO, BE, where a shutter limits the light integration time of the sensor element to the time that the sensor element passes over the second row. Additional color information is obtained from signals pertaining to adjacent original pixels. In fact, one color scan pixel is formed from pixel values in 1.5 rows of original pixels, producing one color scan pixel for each row of original pixels. So, with the scanning of three rows of original pixels (in one clock period), three color scan pixels are produced. Therefore, the scan speed may be up to three times the conventional scan speed of a scanning method in which each pixel on the original image is read by three sensor elements.

The scanning scheme according to FIGS. 6 and 7 results in lower velocity smear than the scanning scheme according to FIGS. 4 and 5, by use of a shutter to improve the scan resolution. In FIGS. 6 and 7, the shutter time (light integration time) is set to one third of the time it takes to pass three consecutive rows of original pixels (also referred to as the line time). Due to the lower velocity smear, the output resolution in the transport direction is tripled when compared to the embodiment of FIGS. 4 and 5. As an example, if the original pixel resolution PRO=575 spi, then the scan pixel resolution PRS=287.5 spi in the row direction, and 575 spi in the transport direction. The centers of the original pixels are at a distance of ½·(1/575)=1/1150 inch off the center of the corresponding scan pixel, which is negligible in practice.

Figures 8, 9:
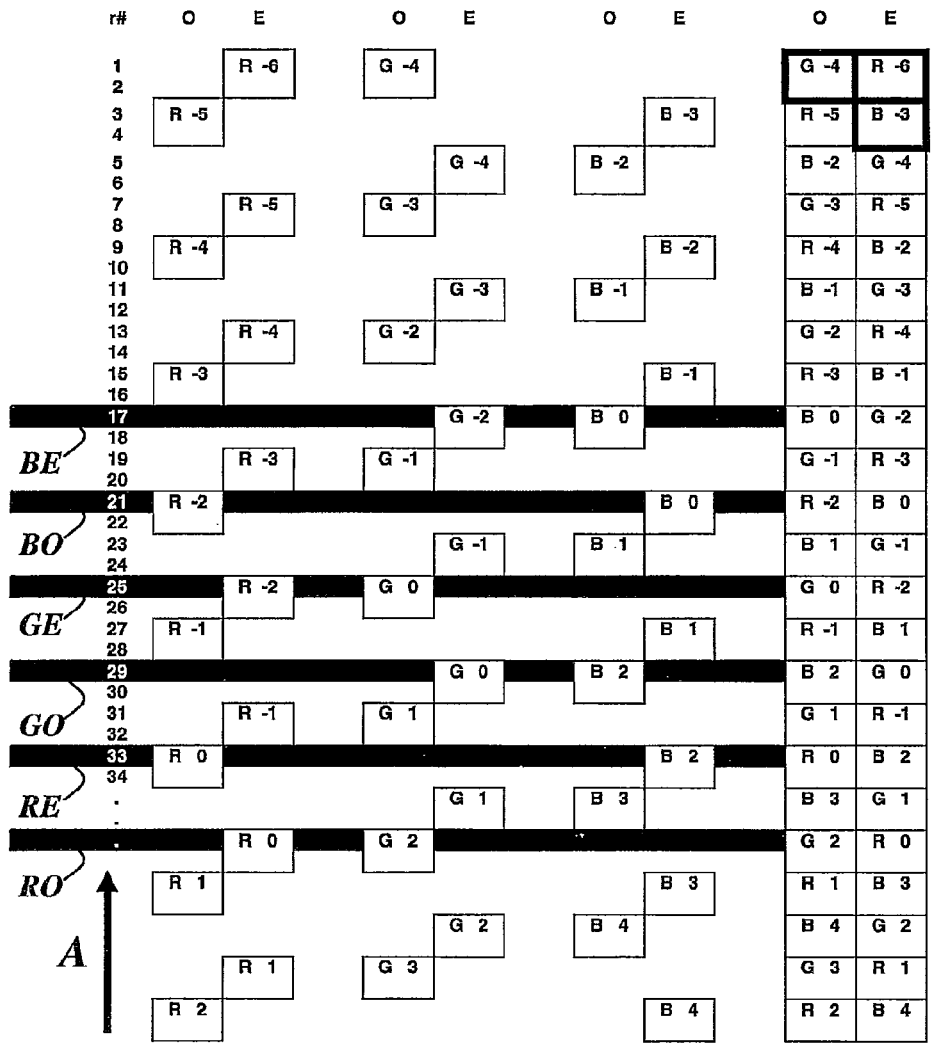
FIG. 8 illustrates a still further method of scanning, employing a shutter, in an embodiment of the present invention.
FIG. 9 illustrates a result of the method of scanning of FIG. 8.

In FIGS. 8 and 9, a scanning scheme is presented in which a shutter is used to double the scan speed at about the same scan resolution.

As an alternative to generating a pixel value of odd and even pixels of rows on the original image as illustrated with reference to FIGS. 4-7, now FIGS. 8 and 9 illustrate that a light integration time of any sensor element RO, RE, GO, GB, BO, BE within each operation cycle stretching over a number of rows of original pixels may be reduced. The way in which this is effected, is by providing a shutter 74 indicated in dashed lines in FIG. 3. Here, a shutter may be defined as a mechanism for limiting a light integration time of a sensor element within each cycle to a part of the cycle time, such as one third (or any other part) of the cycle time. Referring to FIG. 8, the shutter 74 e.g. shuts off the light path from the rows r#1, 2, 5 and 6 to the sensor element RO or BE while the sensor element RO or BE passes over rows 1, 2, 3, 4, 5, and 6, so that the sensor element RO or BE receives the light only from the rows 3 and 4 while passing over rows 1-6. The other sensor elements RE, GO, GE, and BO receive light accordingly, where only the third and fourth one of six consecutive rows of original pixels in one pixel column are scanned.

As illustrated in the pair of columns of odd (O) and even (E) pixels shown at the right-hand side of FIG. 8, as an example, a (color) pixel value of a scan pixel in an odd or even column is generated on the basis of a combination of a signal (pixel value) from sensor element RO or RE, combined with a signal (pixel value) from sensor element GO or GB, and combined with a signal (pixel value) from sensor element BO or BE. Thus, a scan pixel may be formed from signals (pixel values) from a combination of sensor elements RO, GO, and BE, a combination of sensor elements RO, GE, and BO, a combination of sensor elements RE, GO, and BO, a combination of sensor elements RO, GE, and BE, a combination of sensor elements RE, GO, and BE, or a combination of sensor elements RE, GE, and BO.

As an example, in the right-hand pair of columns of FIG. 8, it is illustrated to form a color scan pixel from original pixels in the odd and even columns in rows r#1, 2, 3 and 4 of pixels, by combining signals obtained by sensor element GO in clock period −4, sensor element RE in clock period −6, and sensor element BE in clock period −3, as indicated by bold lines. Thus, two signals from sensor elements for the even pixel column are combined with one signal from a sensor element for an adjacent odd pixel column, to form a color scan pixel of the odd and even columns extending over four adjacent original pixel rows. As another example, a color scan pixel may be formed from rows r#3, 4, 5, and 6 of pixels, by combining signals obtained by sensor element RO in clock period −5, sensor element BE in clock period −3, and sensor element GE in clock period −4. Other color scan pixels may be obtained in a similar way. Here, a difference exists with the method illustrated by FIG. 6, in that in accordance with FIG. 6 each overlapping pair of rows (i.e. e.g. rows r#1 and 2, 2 and 3, 3 and 4, etc.) provides a scan pixel value, whereas in accordance with FIG. 8 each consecutive two pairs of rows (i.e. e.g. rows r#1-4, 3-6, 5-8, etc.) provides a scan pixel value.

Further, in a similar way, color scan pixels for four rows of original pixels in the odd and even pixel columns can also be obtained in the following way. As an example, referring again to the right-hand pair of columns of FIG. 8, a color scan pixel from rows r#1, 2, 3, and 4 of pixels can be formed by combining signals obtained by sensor element GO in clock period −4, sensor element RO in clock period −5, and sensor element BE for an even pixel column not shown in FIG. 8 adjacent to the odd pixel column and on the left-hand side thereof, in a predetermined clock period. Alternatively, a color scan pixel from rows r#1, 2, 3, and 4 of pixels can be formed by combining signals obtained by sensor element GO in clock period −4, sensor element RO in clock period −5, and sensor element BE in clock period −3 for the even pixel column shown in FIG. 8 adjacent to the odd pixel column and on the right-hand side thereof.

FIG. 9 illustrates the combination of signals from sensor elements for forming scan pixels sp#1, 2, and 3 from four adjacent rows r#1-4, 3-6, and 5-8, respectively. In FIG. 9, the origin of the sensor element signal (odd (O) or even (E) column) is indicated between brackets.

In accordance with the above, effectively each third and fourth original pixel (the third and fourth one of six adjacent rows of original pixels in a column) on the original image is read by only one of the sensor elements RO, RE, GO, GE, BO, BE, where a shutter limits the light integration time of the sensor element to the time that the sensor element passes over the third and fourth row. Additional color information is obtained from signals pertaining to adjacent original pixels. In fact, one color scan pixel is formed from pixel values in 3 rows of original pixels, producing one color scan pixel for each two rows of original pixels. So, with the scanning of six rows of original pixels (in one clock period), three color scan pixels are produced. The scan speed may be up to six times the conventional scan speed of a scanning method in which each pixel on the original image is read by three sensor elements.

The scanning scheme according to FIGS. 8 and 9 results in lower velocity smear than the scanning scheme according to FIGS. 4 and 5, by use of a shutter to improve the scan resolution. In FIGS. 8 and 9, the shutter time (light integration time) is set to one third of the time it takes to pass six consecutive rows of original pixels (also referred to as the line time). Due to the low velocity smear, the output resolution in the transport direction is the same as in the embodiment of FIGS. 4 and 5. As an example, if the original pixel resolution PRO=575 spi, then the scan pixel resolution PRS=287.5 spi in the row direction, and also 287.5 spi in the transport direction. The centers of the original pixels are at a distance of ½·(1/575) =1/1150 inch off the center of the corresponding scan pixel in the row direction, and at a distance of 1/575 inch in the transport direction.

A drawback of using a shutter is that due to the shorter light integration period less light can be obtained, resulting in a lower signal/noise ratio. By varying the integration time (by varying the shutter opening time), a trade-off can be made between signal/noise ratio and an image resolution which provides results usable in practice. The use of a shutter increases image resolution. The absence of a shutter leads to velocity smear resulting in a good S/N ratio, and an anti-aliasing effect. For copying or scan-to-print applications, the signal/noise ratio is a minor issue since due to the halftoning in the printer, noise does not become visible on a copy until high noise levels are present. For viewing purposes and enlargements, e.g. on a monitor, noise may become more critical. For line/text applications, a low light integration time in a scan cycle is preferred, while a higher light integration time may be preferred for artwork applications to reduce Moiré effects.

By using three adjacent pixel values from three different color sensor elements, and combining these pixel values (e.g. by applying a function to the signals from the respective sensor elements) to obtain a color pixel value, a high speed scanning of a grey scale or color original may be used to produce an accurate color image. An odd/even effect is highly reduced by combining signals from pixels in adjacent pixel columns.

Other schemes of combining pixel values than the ones shown in FIGS. 4-9 may be used. Also, three sensor elements R, G, B may be used instead of six sensor elements RO, RE, GO, GE, BO, and BE. More than six sensor elements, such as nine sensor elements, to detect red, green and blue light may be used. Sensor elements sensing other colors than red, green and blue light may be used.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of scanning an image on an original, comprising the steps of:
    using an optical sensor comprising parallel sensor line arrays, each for a basic color, comprising sensor elements to generate pixel values of rows of pixels of the scanned image, wherein each pixel value represents an optical density of a pixel of the image;
    using each of the sensor elements to generate pixel values representing substantially different parts of the image, each pixel value of a pixel of the image being determined in a number of different moments in time, and in each of the different moments in time a different basic color component of the pixel value of the pixel is determined;
    using a first sensor element to generate pixel values of pixels of rows on the original in a first column;
    using a second sensor element to generate pixel values of pixels of rows on the original in a second column adjacent to the first column; and
    for a pixel, generating a color pixel value mainly on the basis of a pixel value of at least one of the first sensor elements and pixel values of at least two of the second sensor elements for adjacent pixels.

2. The method of scanning of claim 1, further comprising the steps of:
    using an optical sensor comprising three parallel CCD line arrays for three basic colors; and
    for each pixel, generating a color pixel value mainly on the basis of three pixel values each from sensor elements for different basic colors, for three adjacent pixels.

3. The method of scanning of claim 2, further comprising the steps of:
    situating a first one of the three adjacent pixels immediately to the left or the right of a second one of the three adjacent pixels in a same row of pixels; and
    situating a third one of the three adjacent pixels immediately above or below the second one of the three adjacent pixels in a same column of pixels.

4. The method of scanning of claim 1, further comprising the steps of:
    using sensor elements for three basic colors; and generating each color pixel value mainly on the basis of a pixel value of one first sensor element for one of the basic colors, and pixel values of two second sensor elements each for one of the other two basic colors.

5. The method of scanning of claim 1, wherein the color pixel value is a function of the three pixel values.

6. The method of scanning of claim 1, further comprising the step of obtaining, for three consecutive rows of pixels in a column on the original, a pixel value of a sensor element for the second one of the three rows.

7. The method of scanning of claim 6, further comprising the step of using a mechanism for limiting a light integration time of the sensor elements.

8. The method of scanning of claim 1, further comprising the step of obtaining, for six consecutive rows of pixels in a column on the original, a pixel value of a sensor element for the third and fourth one of the six rows.

9. The method of scanning of claim 8, further comprising the step of using a mechanism for limiting a light integration time of the sensor elements.

10. A scanner, comprising:
an optical sensor comprising parallel sensor line arrays, each for a basic color, the scanner being adapted to generate pixel values of a scanned image,
wherein each pixel value represents an optical density of a pixel of the image, wherein the scanner is adapted to perform a method of scanning an image on an original, comprising the steps of:
using the optical sensor to generate pixel values of rows of pixels of the scanned image, wherein each pixel value represents an optical density of a pixel of the image;
using each of the sensor elements to generate pixel values representing substantially different parts of the image, each pixel value of a pixel of the image being determined in a number of different moments in time, and in each of the different moments in time a different basic color component of the pixel value of the pixel is determined;
using a first sensor element to generate pixel values of pixels of rows on the original in a first column;
using a second sensor element to generate pixel values of pixels of rows on the original in a second column adjacent to the first column; and
for a pixel, generating a color pixel value mainly on the basis of a pixel value of at least one of the first sensor elements and pixel values of at least two of the second sensor elements for adjacent pixels.

11. The scanner of claim 10, wherein the sensor elements are line arrays of CCDs.

12. The scanner of claim 11, wherein the mechanism is adapted to limit the light integration time of the sensor elements within each cycle to a time of not more than two thirds or one half or one third of the cycle time.

13. The scanner of claim 10, wherein the sensor elements are adapted to operate periodically with a certain cycle time, and wherein the scanner further comprises a mechanism for limiting a light integration time of the sensor elements within each cycle to a time less than the cycle time.

* * * * *